United States Patent
Wunderlich

(10) Patent No.: US 11,061,511 B2
(45) Date of Patent: Jul. 13, 2021

(54) OPERATING DEVICE AND METHOD FOR DETECTING A USER SELECTION OF AT LEAST ONE OPERATING FUNCTION OF THE OPERATING DEVICE

(71) Applicant: AUDI AG, Ingolstadt (DE)

(72) Inventor: Matthias Wunderlich, Ingolstadt (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 16/084,007

(22) PCT Filed: Jan. 18, 2017

(86) PCT No.: PCT/EP2017/050915
§ 371 (c)(1),
(2) Date: Sep. 11, 2018

(87) PCT Pub. No.: WO2017/157542
PCT Pub. Date: Sep. 21, 2017

(65) Prior Publication Data
US 2019/0346966 A1    Nov. 14, 2019

(30) Foreign Application Priority Data
Mar. 12, 2016 (DE) .................. 102016003072.0

(51) Int. Cl.
*G06F 3/042* (2006.01)
*G06T 7/521* (2017.01)
(Continued)

(52) U.S. Cl.
CPC .......... *G06F 3/0425* (2013.01); *G06F 3/0482* (2013.01); *G06F 3/04883* (2013.01);
(Continued)

(58) Field of Classification Search
CPC .. G06F 3/0425; G06F 3/0482; G06F 3/04883; G06F 2203/04104;
(Continued)

(56) References Cited

U.S. PATENT DOCUMENTS

2006/0022956 A1* 2/2006 Lengeling ........... G06F 3/04842
345/173
2008/0273755 A1* 11/2008 Hildreth ................ G06F 1/1626
382/103
(Continued)

FOREIGN PATENT DOCUMENTS

DE    10 2008 022 752 A1    11/2009
DE    10 2008 048 825 A1    3/2010
(Continued)

OTHER PUBLICATIONS

International Search Report for PCT/EP2017/050915 dated May 24, 2017.
(Continued)

*Primary Examiner* — Sahlu Okebato
(74) *Attorney, Agent, or Firm* — Staas & Halsey LLP

(57) ABSTRACT

One, some or all of a specified number of multiple operating functions of an operating device can be selected by a user. Each operating function is assigned to a respective finger of a hand of the user in the operating device by a controller, and a detection device is used to detect a contact of at least one of the fingers of the hand on a specified contact surface of the operating device and ascertain which of the fingers of the hand is contacting the contact surface. Each of the operating functions whose assigned finger contacts the contact surface is determined as the user selection by a controller, and the user selection is signaled to a subsequent process of the operating device using selection data which identifies each selected operating function.

12 Claims, 5 Drawing Sheets

(51) Int. Cl.
   *G06F 3/0482* (2013.01)
   *G06F 3/0488* (2013.01)
   *G06K 9/00* (2006.01)
   *B60K 37/06* (2006.01)
(52) U.S. Cl.
   CPC .......... *G06K 9/00375* (2013.01); *G06T 7/521* (2017.01); *B60K 37/06* (2013.01); *B60K 2370/1472* (2019.05); *B60K 2370/166* (2019.05); *G06F 2203/04104* (2013.01); *G06F 2203/04108* (2013.01); *G06F 2203/04808* (2013.01); *G06T 2207/30196* (2013.01); *G06T 2207/30268* (2013.01)
(58) Field of Classification Search
   CPC . G06F 2203/04108; G06F 2203/04808; G06T 7/521; G06T 2207/30196; G06T 2207/30268; G06K 9/00375; B60K 2370/1472; B60K 2370/166; B60K 37/06
   See application file for complete search history.

(56) References Cited

U.S. PATENT DOCUMENTS

| | | | |
|---|---|---|---|
| 2009/0028395 A1 | 1/2009 | Riionheimo | |
| 2011/0234503 A1* | 9/2011 | Fitzmaurice | G06F 3/0235 345/173 |
| 2014/0160035 A1* | 6/2014 | Sauer | G06F 3/041 345/173 |
| 2016/0306606 A1* | 10/2016 | Ko | G06F 3/167 |

FOREIGN PATENT DOCUMENTS

| | | |
|---|---|---|
| DE | 10 2010 048 745 A1 | 4/2012 |
| EP | 1 865 404 A1 | 12/2007 |
| EP | 2 124 139 A1 | 11/2009 |
| EP | 2 977 882 A1 | 1/2016 |
| WO | 2013/080425 A1 | 6/2013 |

OTHER PUBLICATIONS

German Office Action for German Application No. 10 2016 003 072.0 dated Oct. 12, 2016.
DE102016003072.0, Mar. 12, 2016, Matthias Wunderlich, Audi AG.
PCT/EP2017/050915, Jan. 18, 2017, Matthias Wunderlich, Audi AG.
English Translation by WIPO dated Sep. 13, 2018 of the International Preliminary Report on Patentability in corresponding International Patent Application No. PCT/EP2017/050915.
Chinese Office Action dated Oct. 20, 2020 from Chinese Application No. 201780017760.5, 10 pages.

* cited by examiner

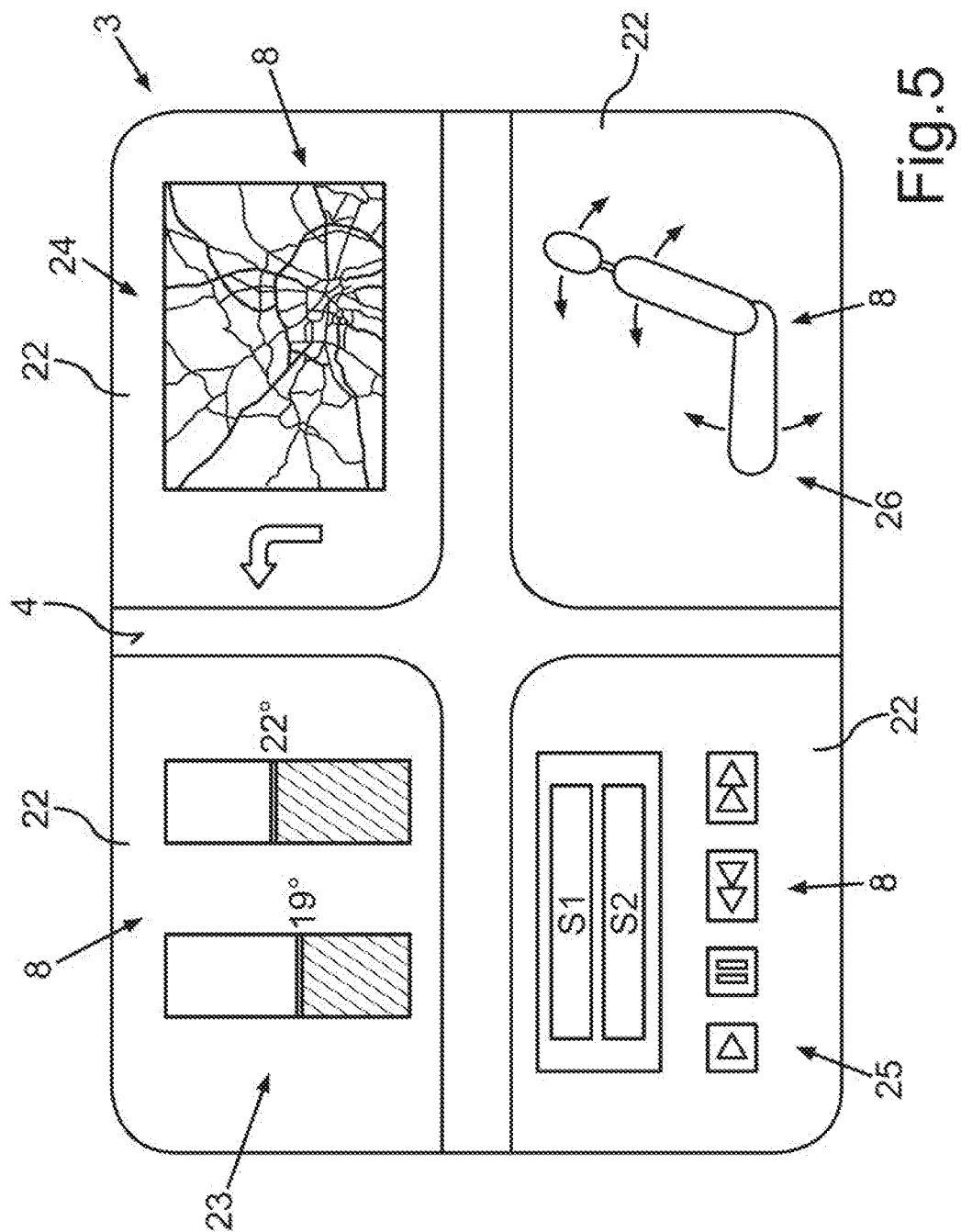

OPERATING DEVICE AND METHOD FOR DETECTING A USER SELECTION OF AT LEAST ONE OPERATING FUNCTION OF THE OPERATING DEVICE

CROSS REFERENCE TO RELATED APPLICATIONS

This application is the U.S. national stage of International Application No. PCT/EP2017/050915, filed Jan. 18, 2017 and claims the benefit thereof. The International Application claims the benefit of German Application No. 10 2016 003 072.0 filed on Mar. 12, 2016, both applications are incorporated by reference herein in their entirety.

BACKGROUND

Described below is a method for detecting a user selection of one or more or all of the operating functions from a predetermined set of a plurality of operating functions of an operating device. The user selection can be executed by the user using his fingers. Also described are an operating device by which a plurality of operating functions are made available, from which a user can make a user selection and a motor vehicle having such an operating device.

In a motor vehicle a central operating device can be made available which permits a user of the motor vehicle to operate a plurality of different vehicle components by a respective operating function. For example, an operating function for an air conditioning device and an operating function for a media playback device, for example a radio, and an operating function for the navigation device of the motor vehicle can be made available. Each operating function can include, for example, a user interface, in particular a graphical user interface (GUI), for the respective vehicle component. If a user of the motor vehicle then wishes to operate a plurality of the vehicle components, the respective operating function for the vehicle component must activate in the operating device. This is generally possible only successively, which makes the operating process time-consuming and therefore laborious in that it is necessary to change between the operating functions. If a driver wishes, for example, alternately to operate the radio, adjust the air conditioning device and make settings in the navigation device he is required to activate the corresponding operating function in the operating device each time for this purpose.

An operating device for a motor vehicle can have, for example, a touchscreen for detecting user inputs. With respect to the detection of user inputs on a touchscreen, DE 10 2010 048 745 A1 has disclosed that a plurality of graphical objects can be displayed on the display face of a touchscreen, which objects can be selected or activated by touch. If, in contrast, a 2-finger operating process is detected on the touchscreen, a sliding mode for the objects is activated in order to be able to re-arrange the objects on the display face.

DE 10 2008 022 752 A1 has also disclosed detecting a plurality of contact positions on a touchscreen and as a result controlling operations during the operating process, for example the zooming of map representations, the rotation of map representations or the selection of an object.

DE 10 2008 048 825 A1 discloses a screen which has a gesture detection unit by which an activation gesture is detected which detects the approaching of a spread-out hand to the screen and subsequently activates a modifying mode for the operating device.

Operating devices by which a plurality of operating functions are made available are, however, not known in conjunction with motor vehicles. For example, a portable, mobile terminal, such as for example a smartphone or a tablet PC, also makes available a plurality of operating functions, in each case one for operating a program or an application of the terminal.

SUMMARY

The method performs configuring in a more efficient way, in the case of an operating device which makes available a predetermined set of selectable operating functions, the use of a plurality of these operating functions.

The method detects a user selection of one or more or of all the operating functions from a predetermined set of a plurality of operating functions of an operating device. The operating device can be provided, for example, for operating a plurality of vehicle components for a motor vehicle or a plurality of applications of a mobile terminal such as, for example, a smartphone or tablet PC. In the operating device, in each case a finger of a hand of a user is assigned to each of the operating functions of the set by a control device. An instance of finger contact of at least one of the fingers of the hand, in particular a plurality of fingers, is detected by a detection device on a predetermined contact face of the operating device. If a plurality of instances of finger contact are detected, there is provision that it is a case of simultaneous instances of finger contact. Furthermore, the detection device determines which of the fingers of the hand contacts the contact face, that is to say whether, for example, the thumb and an index finger or the thumb and a middle finger carry out the respective one instance of finger contact. The contact face can be, for example, a surface, for example the surface of a touchscreen or the surface of a touch-sensitive operating face, that is to say what is referred to as a touchpad, or else a virtual contact face which can be freely defined in space. Each of the operating functions whose assigned finger contacts the contact face is specified as the user selection as a whole by the control device. The user selection is signaled to a subsequent process of the operating device by selection data which identify each selected operating function. The selection data therefore makes available information as to which of the operating functions the user has selected using his fingers.

The method has an advantage in that a user can select a plurality of operating functions simultaneously and in this context the selection can be any desired combination of the selectable operating functions of the set which are present, since the user can specify individually with each finger which of the operating functions he would like to select. In this context, there is in particular, of course, provision that in each case another of the operating functions is assigned to each finger.

According to one development, the user selection is only specified if a confirmation gesture of the hand is detected by the detection device. The user can therefore execute this instance of finger contact on the contact face with at least one finger and can provisionally mark an operating function without as a result initially specifying the user selection. Only after he has also executed the confirmation gesture is the user selection specified. This provides the advantage that the user can still move his fingers around on the contact face, that is to say can change the finger contact, and only confirms the conclusive combination of instances of finger contact by the confirmation gesture, and as a result specifies the user selection.

In order to avoid inadvertently changing the finger contact combination when the confirmation gesture is executed, one development provides that an overall movement of the hand together with the fingers which contact the contact face in a predetermined direction along the contact face is detected as the confirmation gesture. The user can therefore retain the position of the fingers on his hand and merely has to move his entire hand in the predetermined direction. This prevents the combination of the instances of finger contact being changed when the confirmation gesture is executed.

In order to make the selection of the operating functions more easily recognizable, a development is provided in which the operating functions of the set, that is to say the selectable operating functions, are respectively represented by a dedicated graphical object on a display face, that is to say, for example, displayed on a screen. Such a graphical object can be, for example, an icon or lettering. The respective graphical object of each operating function, excluded from the user selection, that is to say each non-selected operating function of the set, is deleted from the display face. Each object which is selected by the user selection continues to be displayed. As a result, the user can use a single selection to remove all those graphical objects which he does not wish to have displayed. The combination of the objects to be deleted, or the remaining objects, can be set as desired here, since one finger can be used for each graphical object. By this development, a user can adapt, for example, a menu structure to his requirements, that is to say can individualize the menu structure. For this purpose, he uses finger contact to retain as graphical objects those menu entries which he would like to use.

The graphical objects may be displayed in a different spatial region than the one in which the finger contact of the at least one finger is detected. The user therefore does not have to use his fingers to contact the respective graphical object but instead can execute the finger contact on a contact face next to the graphical objects. As a result, when the fingers are applied to the contact face, that is to say during the instances of finger contact, the graphical objects remain visible to the user. In this context there may be provision that those graphical objects for which an instance of finger contact of the assigned finger has been detected are not graphically marked.

With respect to the representation of the selectable operating function by a respective graphical object, one development provides that each selected operating function is activated, that is to say, for example, a respective graphical user interface is started or displayed, and in this context the display face is operated in a sub-divided fashion in such a way that a respective dedicated sub-region of the display face is available for outputting respective functional data simultaneously for each activated operating function. In particular, a plurality of operating functions are activated. Therefore, for example the display face is sub-divided in such a way that each operating function can display its graphical user interface. Thus, a user can therefore make a personal selection of operating functions and simultaneously has all the operating functions available on the display face, that is to say they can be operated by him.

In the text which follows, developments are described which relate to the detection of the finger contact and the identification of the fingers.

According to one development, the finger contact of the at least one finger on the contact face is detected by a sensor matrix with proximity-sensitive and/or contact-sensitive sensors, that is to say, for example, capacitive sensors. As a result, an instance of finger contact can be detected, for example, on a touchscreen or a touchpad. Additionally or alternatively there can be provision for this purpose that the finger contact of the at least one finger on the contact face is detected by a camera. For this purpose, an object recognition device can evaluate camera images or image data. The camera can be, in particular, a time-of-flight camera, (TOF camera) by which distance data can also be determined, which data can be used during the detection of a distance of a finger from the contact face.

One development provides that in order to identify the at least one finger which contacts the contact face an arrangement of contact points of the contacting fingers on the contact face is used as the basis. It can therefore be provided, for example, that the graphical objects on the display face are displayed in a predetermined arrangement pattern, and the contact points of the fingers are checked to determine which contact pattern they form. By comparing the arrangement pattern with the contact pattern it is possible to specify which finger contacts the contact face. Additionally or alternatively to the analysis of the arrangement of contact points, one development provides that the fingers of the hand are detected by the time-of-flight camera, and each finger of the hand is recognized in 3D image data of the time-of-flight camera and a respective distance of each finger from the contact face is determined. As a result it is then known which finger contacts the contact face. The virtual contact face can also be implemented this way.

In order to carry out the method, an operating device is provided for detecting a user selection of one or more or all of the operating functions from a predetermined set of a plurality of operating functions of the operating device. The operating device includes a detection device for detecting an instance of finger contact of at least one finger of a hand of a user (in particular a plurality of fingers) on a predetermined contact face of the operating device and for determining which of the fingers of the hand contacts the contact face. Furthermore, the operating device includes a control device which is configured to assign one finger of the hand of the user to each of the operating functions of the set and to specify each of the operating functions whose assigned finger contacts the contact face as the user selection as a whole, and to signal the user selection to a subsequent process of the operating device by selection data which identify each selected operating function. The control device can be implemented, for example, on the basis of a processor device, for example a microcontroller or microprocessor. As a whole, the operating device is configured to implement an embodiment of the method. For this purpose it is, for example, also possible to provide a corresponding program module which can be executed, for example by the processor device of the control device and which, during the execution process, implements or carries out the method executed by the control device.

As already stated, the operating device can, in particular, also be used to advantage in a motor vehicle. The motor vehicle may be configured as a car, in particular as a passenger car or as a truck.

BRIEF DESCRIPTION OF THE DRAWINGS

In the text which follows, an exemplary embodiment is described that makes the aspects and advantages more apparent and more readily appreciated, taken in conjunction with the accompanying drawings of which:

FIG. 5 is a schematic illustration of a display face of the operating device, which can be operated in a sub-divided fashion in such a way that a plurality of operating functions can output respective functional data simultaneously.

DETAILED DESCRIPTION OF THE PREFERRED EMBODIMENT

An exemplary embodiment is described in the text which follows. In the exemplary embodiment, the described components of the embodiment each represent individual features which can be considered independently of one another and which each also may be used independently of one another and can therefore also be considered individually or in another combination than that shown. Furthermore, other features than those already described can also be added to the described embodiment.

In the figures, functionally identical elements are respectively provided with the same reference symbols.

Figure 1:
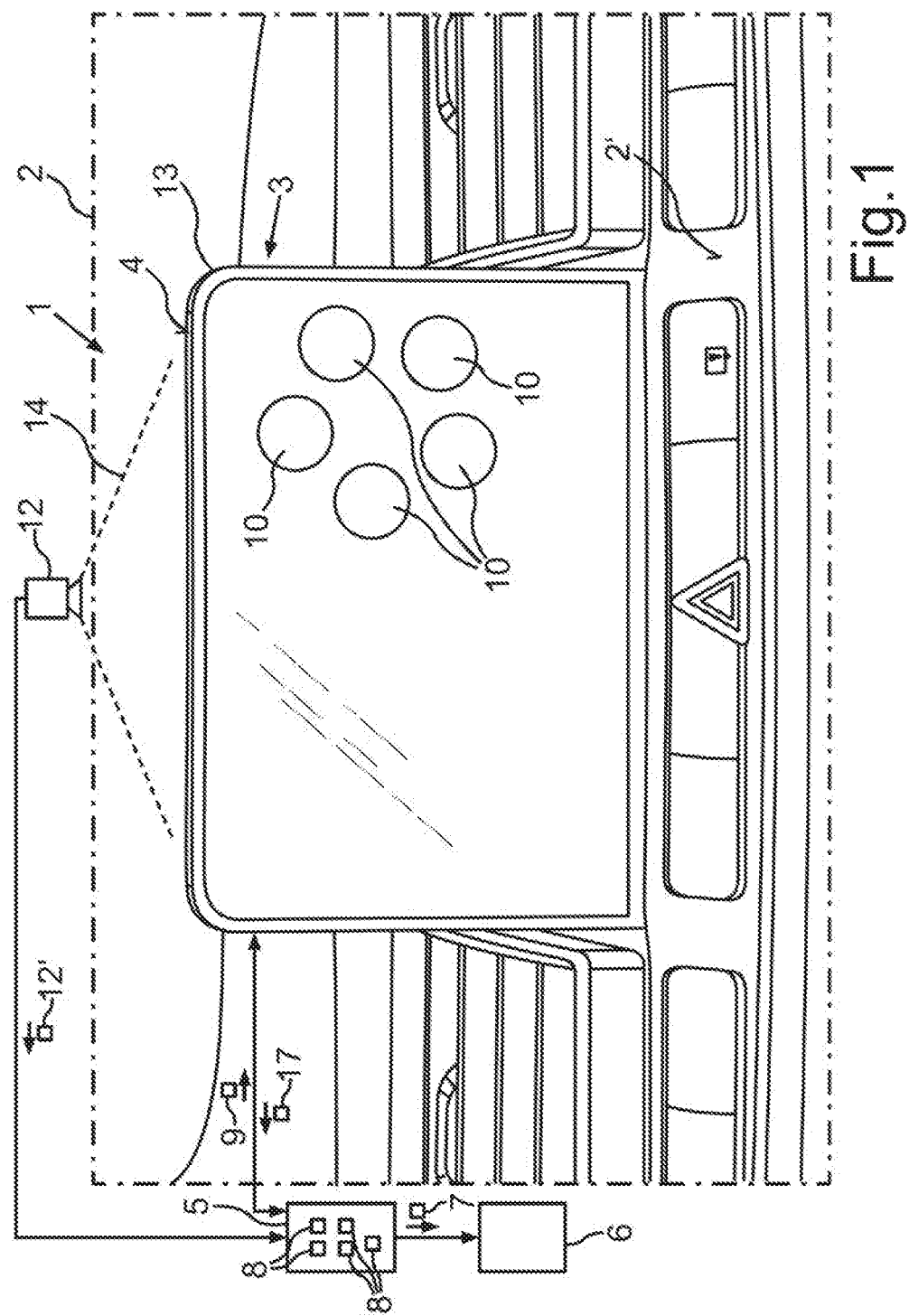
FIG. 1 is a schematic illustration providing a block diagram and front view of an embodiment of the operating device during the display of graphical objects which each represent a selectable operating function of the operating device.

FIG. 1 shows an operating device 1 which can be made available, for example, in a motor vehicle 2 or (not illustrated) in a portable mobile terminal, for example a smartphone or a tablet PC. The operating device 1 can have a display device 3 with a display face 4. The display device 3 can be, for example, a screen or a head-up display. A display content on the display face 4 can be controlled by a control device 5 which can be implemented, for example, on the basis of a microcontroller or a microprocessor. The control device 5 can control, for example, device components 6, for example vehicle components of the motor vehicle 2, by a corresponding control signal 7. The device components 6 are illustrated in FIG. 1 merely by a single element. For each of the device components 6, the control device 5 can make available a respective operating function 8 by which, for example, a graphical user interface for operating the respective device component or a control function for triggering a device function of the respective device component can be implemented. The control device 5 can represent the operating functions 8 by corresponding graphical data 9 on the display face 4 of the display device 3, respectively by a graphical object 10, for example an icon or lettering, or a menu entry.

The operating device 1 makes it possible for a user now to select a plurality of the graphical objects 10 simultaneously and as a result make a selection, for example in a menu, of the operating functions 8 which are to be offered to the user on the display face 4, that is to say a selection of only the graphical objects 10 which are still to be displayed. It is also possible to implement simultaneous activation of a plurality of the operating functions 8 by a corresponding simultaneous selection of a plurality of the graphical objects 10. In order to recognize or detect the user selection, the operating device 1 can have a detection device 11 which can include, for example, a camera 12, in particular a TOF camera, and/or a proximity-sensitive and/or contact-sensitive sensor matrix 13. The sensor matrix 13 can be made available, for example, on the display face 4, that is to say in this case the display device 3 is a touchscreen. A detection range 14 of the camera 12 can also be directed toward the display face 4.

Figure 2:
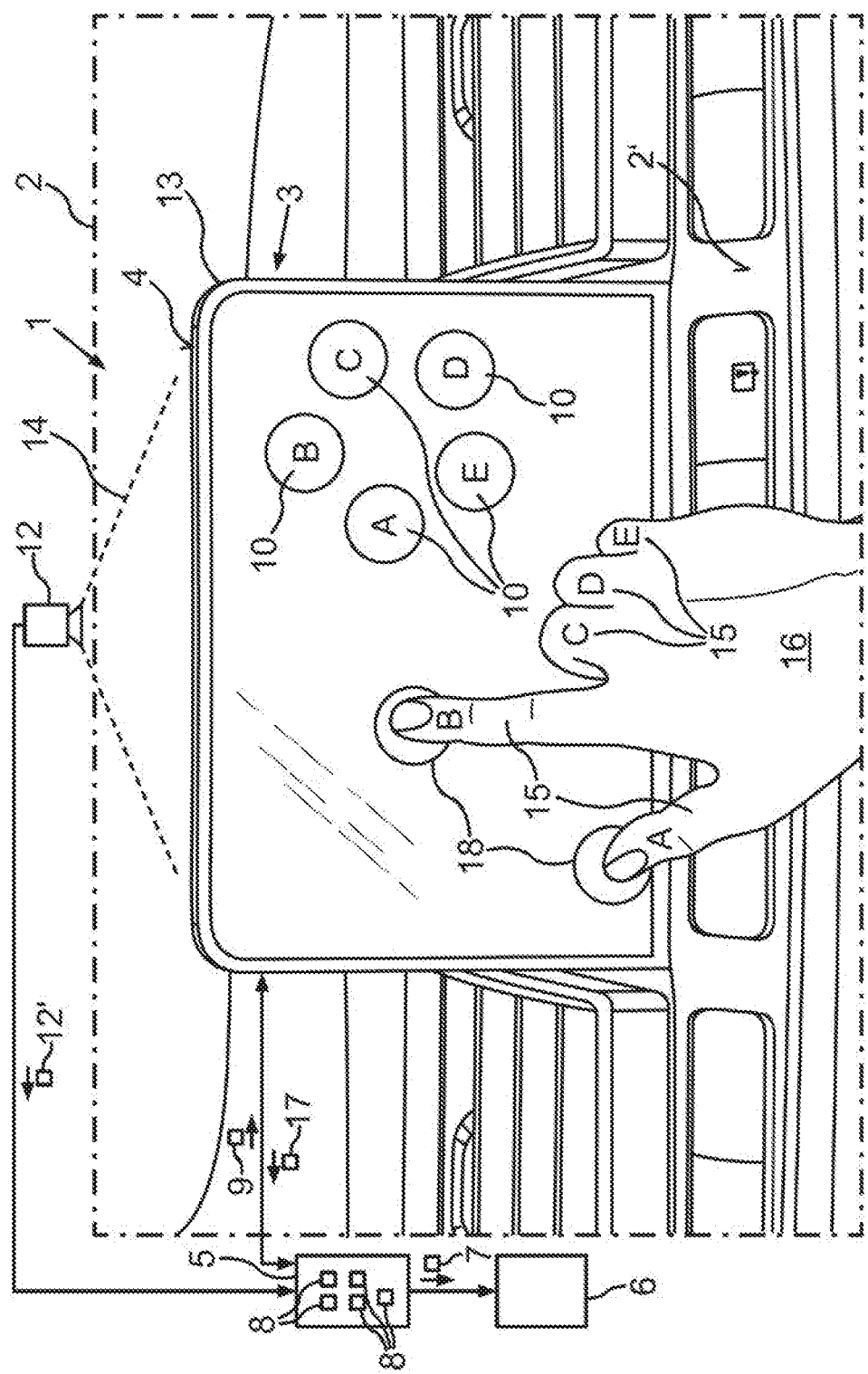
FIG. 2 is a schematic illustration providing a block diagram and front view of the operating device in FIG. 1 during the detection of a plurality of instances of finger contact on a contact face.

FIG. 2 illustrates how the control device 5 detects that the user contacts the contact face 4 with fingers 15 of his hand 16. The contact face 4 constitutes a contact face in this case. The control device 5, assigns the fingers 15 of the hand 16 respectively to the operating functions 8. Accordingly, one of the fingers is also respectively assigned to each of the graphical objects 10. A possible assignment is illustrated in FIG. 2 by corresponding letters A, B, C, D, E.

The detection device 11 is able to detect which finger 15 the user uses to contact the contact face in the form of the display face 4. In the example shown, these are the fingers A, B, that is to say the thumb and the index finger, for example.

Corresponding instances of finger contact 18 can be detected, for example, on the basis of 3D image data 12' of the camera 12 and/or contact data 17 of the sensor matrix 13 by the detection device 11 and signaled to the control device 15. It is also signaled which of the fingers 15, that is to say the fingers A, B here, carry out the instances of finger contact 18 on the contact face in the form of the display face 4.

Figure 3:
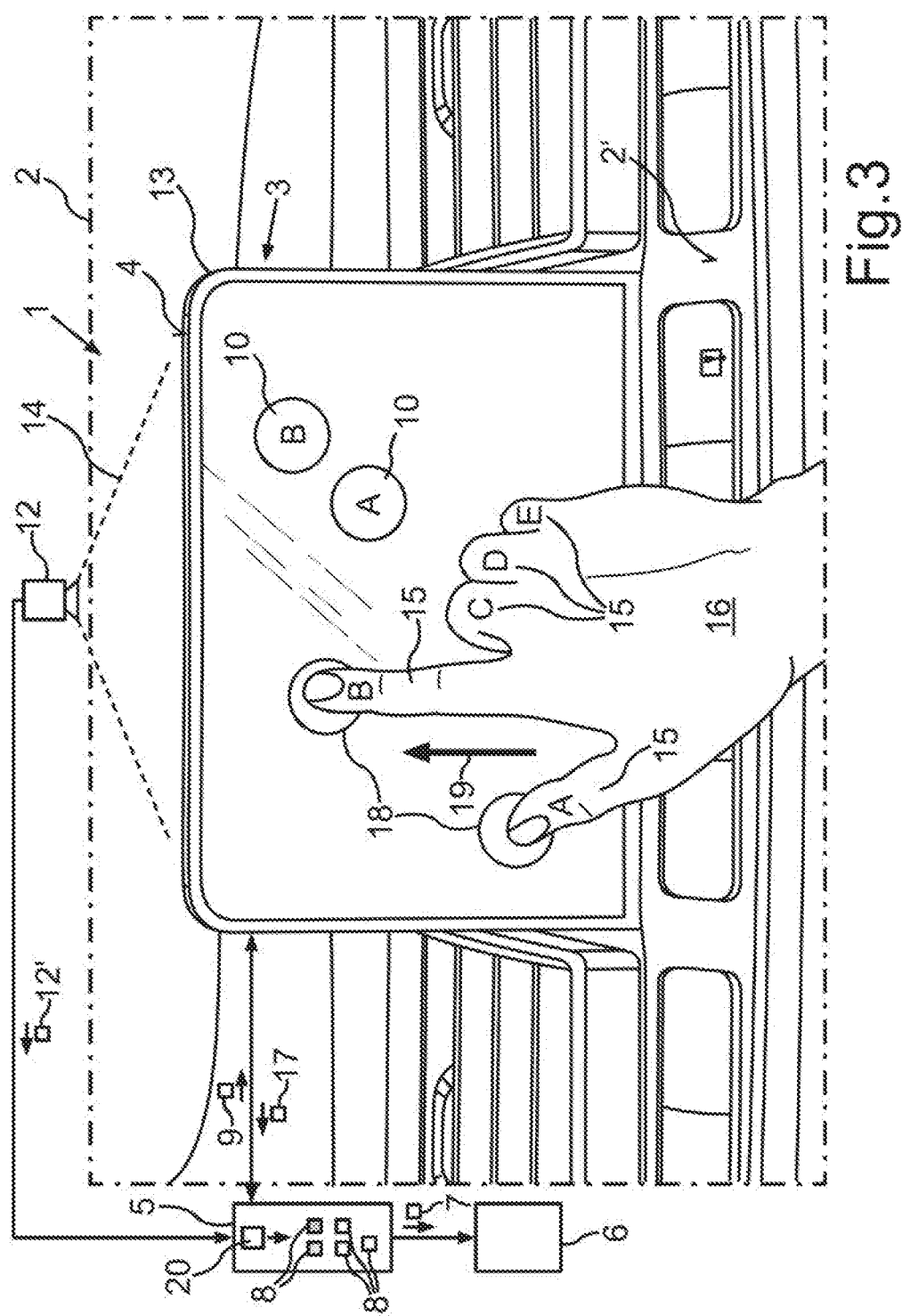
FIG. 3 is a schematic illustration providing a block diagram and front view of the operating device during the detection of a confirmation gesture.

FIG. 3 illustrates how the user confirms, by a confirmation gesture 19, the selection of the operating functions 8 selected by the instances of finger contact 18. The control device 5 deletes the other, non-selected graphical objects 10 on the display face 4 by adapting the corresponding graphical data 9. It is then possible to provide that only an operating menu which has been adapted in this way is then displayed to the user in future on the display face 4.

The confirmation gesture can be, for example, a movement of the hand together with the fingers 15 along a predetermined movement direction, for example upward in FIG. 3. When the confirmation gesture 19 is detected, selection data 20 which describe which of the operating functions 8 the user has selected are generated by the control device 5.

Figure 4:
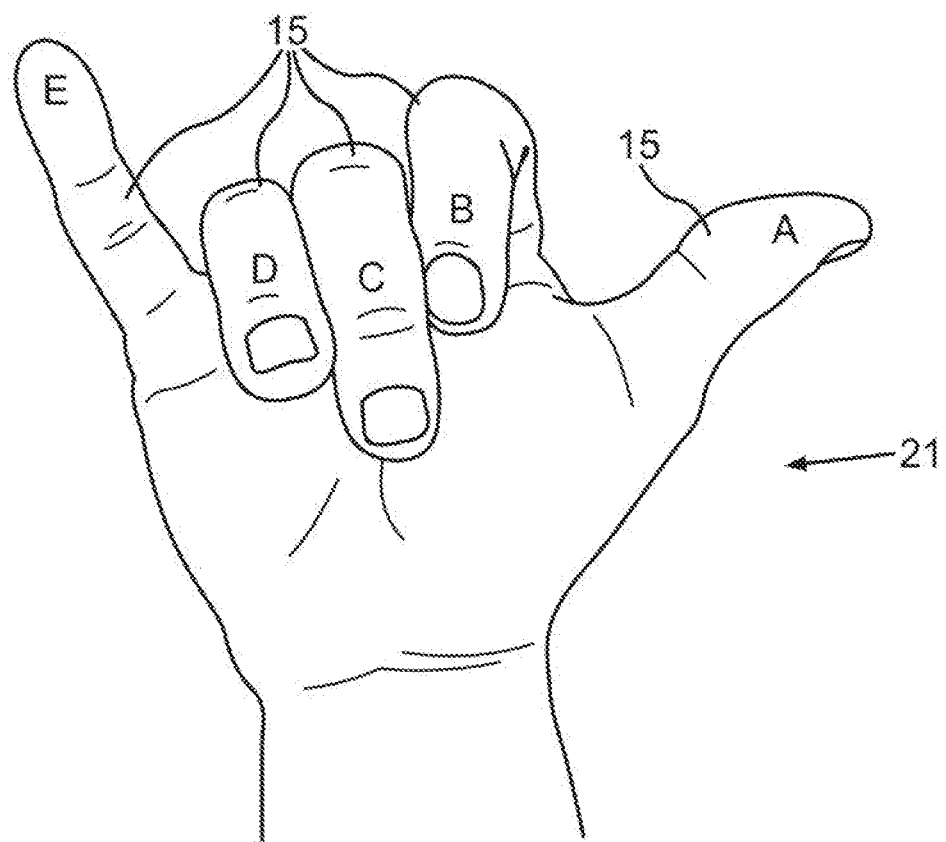
FIG. 4 is a schematic perspective view of a hand of a user during a selection of two other operating functions of the operating device.

FIG. 4 illustrates the finger position 21 with which the user could select two different operating functions 8 on the operating face, namely those operating functions 8 which are assigned to the fingers A, E.

FIG. 5 illustrates, as an alternative to the configuration of an operating menu, how the selected operating functions 8, as described by the selection data 20, can be activated simultaneously and how a sub-face or a sub-region 22 is made available for each operating function on the display face 4 in accordance with the number of selected operating functions, in which sub-region 22 each activated operating function 8 respectively outputs functional data, for example displays status data or makes available contact faces or operating faces for receiving user inputs for the respective operating function 8. FIG. 5 shows by way of example how four operating functions 8 can be displayed by the display device 3. For example, an air conditioning setting 23, a navigation operating device 24, a media playback operating device 25 for playing back, for example, music files S1, S2, and a seat-setting function 26 for setting a sitting position can be represented as a respective operating function 8 simultaneously on the display face 4 in a respective sub-region 22.

Therefore, the operating device 1 permits a multi-contact gesture operating system or multi-touch gesture operating system for menu selection of a plurality of operating functions 8. The gesture operating system on the contact-sensitive display face 4 of a touchscreen 3 or else on a virtual contact level or a contact level of a touchpad serves to detect a desired arrangement of the menu structure or for simultaneously activating a plurality of operating functions.

In the case of the menu arrangement it is possible, as illustrated in FIG. 1, initially to display a standard orientation of the individual menu points in the form of a respective graphical object 10, for example for radio or navigation. FIG. 2 illustrates how the selection is made by detection of instances of finger contact 18 or finger taps, wherein the number and the finger position are determined. FIG. 3 shows how all the menu items in the form of the graphical objects 10 apart from the selected ones are removed by sliding upward or by an alternative direction of movement.

The described gestures can be detected on the touchscreen by the sensor matrix 13 or can be freely detected in the air by contactless recognition by a TOF camera. Corresponding program modules can be adapted with little expenditure to the respective configuration of the operating device 1.

Overall, the example shows how a multi-touch gesture operating system provides for menu selection.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for detecting a user selection from among a predetermined set of operating functions of an operating device, comprising:
   displaying all of the operating functions of the predetermined set, each represented by a dedicated graphical object, on a display face;
   assigning fingers of a hand of a user to each of the operating functions of the predetermined set, by a control device, so that each finger corresponds to a different operating function;
   detecting finger contacts of at least two of the fingers of the hand, by a detection device, on a predetermined contact face of the operating device;
   determining selection fingers, among the fingers of the hand, that contact the predetermined contact face;
   specifying a whole user selection of selected operating functions, each selected operating function corresponding to one of selection fingers, by the control device;
   signaling the whole user selection to a subsequent process of the operating device by selection data identifying the selected operating functions;
   displaying the selected operating functions respectively represented by the dedicated graphical object on the display face in the subsequent process while excluding the dedicated graphical object of any operating function excluded from the whole user selection, the dedicated graphical object of each selected operating function being displayed in a first spatial region different than a second spatial region in which the finger contacts of the at least two of the fingers are detected;
   activating, in the subsequent process, the selected operating functions; and
   outputting on the display face, in a sub-divided fashion, in a respective dedicated sub-region of the display face, respective functional data simultaneously for the selected operating functions.

2. The method as claimed in claim 1,
   further comprising detecting a confirmation gesture of the hand by the detection device, and
   wherein the specifying of the whole user selection is performed only when the confirmation gesture of the hand is detected by the detection device.

3. The method as claimed in claim 2, wherein an overall movement of the hand together with the fingers which contact the contact face in a predetermined direction along the contact face is detected as the confirmation gesture.

4. The method as claimed in claim 3, wherein the detection device detecting the finger contacts of the at least two of the fingers on the contact face is at least one of a sensor matrix with proximity sensitivity, contact-sensitive sensors and a camera.

5. The method as claimed in claim 4, wherein the determining of the selection fingers that contact the contact face includes at least one of
   detecting an arrangement of contact points of contacting fingers on the contact face, and
   a sequence of
      detecting the fingers of the hand by a time-of-flight camera;
      recognizing each finger of the hand in 3D image data of the time-of-flight camera; and
      determining a respective distance of each finger from the contact face.

6. The method as claimed in claim 3, wherein the determining of the selection fingers that contact the contact face includes at least one of
   detecting an arrangement of contact points of contacting fingers on the contact face, and
   a sequence of
      detecting the fingers of the hand by a time-of-flight camera;
      recognizing each finger of the hand in 3D image data of the time-of-flight camera; and
      determining a respective distance of each finger from the contact face.

7. The method as claimed in claim 2, wherein the detection device detecting the finger contacts of the at least two of the fingers on the contact face is at least one of a sensor matrix with proximity sensitivity, contact-sensitive sensors and a camera.

8. The method as claimed in claim 2, wherein the determining of the selection fingers that contact the contact face includes at least one of
   detecting an arrangement of contact points of contacting fingers on the contact face, and
   a sequence of
      detecting the fingers of the hand by a time-of-flight camera;
      recognizing each finger of the hand in 3D image data of the time-of-flight camera; and
      determining a respective distance of each finger from the contact face.

9. The method as claimed in claim 1, wherein the detection device detecting the finger contacts of the at least two of the fingers on the contact face is at least one of a sensor matrix with proximity sensitivity, contact-sensitive sensors and a camera.

10. The method as claimed in claim 1, wherein the determining of the selection fingers that contact the contact face includes at least one of
    detecting an arrangement of contact points of contacting fingers on the contact face, and a sequence of
    detecting the fingers of the hand by a time-of-flight camera;
    recognizing each finger of the hand in 3D image data of the time-of-flight camera; and
    determining a respective distance of each finger from the contact face.

11. An operating device for detecting a whole user selection from among a predetermined set of distinct operating functions of the operating device, comprising:
    a display face initially displaying all of the distinct operating functions of the predetermined set, each operating function represented by a dedicated graphical object;
    a contact face;
    a detection device detecting finger contacts of at least two fingers of a hand of a user on the contact face of the operating device and determining selection fingers, among all fingers of the hand, that contact the contact face; and
    a control device configured to
        assign all of the fingers of the hand respectively to the distinct operating functions of the predetermined set, so that each finger corresponds to a different operating function,
        specify the whole user selection of selected operating functions, each selected operating function corresponding to one of the selection fingers,
        signal the whole user selection to a subsequent process of the operating device by selection data identifying the selected operating functions,
        display the selected operating functions respectively represented by the dedicated graphical object on the display face in the subsequent process while excluding the dedicated graphical object of any operating function excluded from the whole user selection, the dedicated graphical object of each selected operating function being displayed in a first spatial region different than a second spatial region in which the finger contacts of the at least two of the fingers are detected,
        activate, in the subsequent process, the selected operating functions, and output on the display face in a respective dedicated sub-region of the display face, respective functional data simultaneously for the selected operating functions.

12. A motor vehicle, comprising:
    a chassis; and
    an operating device, including
        a display face initially displaying all of the operating functions of the predetermined set, each operating function represented by a dedicated graphical object;
        a contact face;
        a detection device detecting finger contacts of at least two fingers of a hand of a user on the contact face of the operating device and determining selection fingers, among all fingers of the hand, that contact the contact face; and
        a control device configured to
            assign the fingers of the hand to each of the operating functions of the predetermined set, so that each finger corresponds to a different operating function,
            specify the whole user selection of selected operating functions, each selected operating function corresponding to one of the selection fingers,
            signal the whole user selection to a subsequent process of the operating device by selection data identifying the selected operating functions,
            display the selected operating functions respectively represented by the dedicated graphical object on the display face in the subsequent process while excluding the dedicated graphical object of any operating function excluded from the whole user selection, the dedicated graphical object of each selected operating function being displayed in a first spatial region different than a second spatial region in which the finger contacts of the at least two of the fingers are detected,
            activate, in the subsequent process, the selected operating functions, and
            output on the display face in a respective dedicated sub-region of the display face, respective functional data simultaneously for the selected operating functions.

* * * * *